US012089348B2

(12) United States Patent
Lin et al.

(10) Patent No.: US 12,089,348 B2
(45) Date of Patent: Sep. 10, 2024

(54) ELECTRONIC DEVICE WITH CURVED SCREEN

(71) Applicant: Huawei Technologies Co., Ltd., Shenzhen (CN)

(72) Inventors: Xinwei Lin, Dongguan (CN); Lupeng Yao, Shenzhen (CN); Hao Chen, Shenzhen (CN); Xin Zhu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 495 days.

(21) Appl. No.: 17/368,308

(22) Filed: Jul. 6, 2021

(65) Prior Publication Data

US 2021/0337677 A1    Oct. 28, 2021

Related U.S. Application Data

(63) Continuation of application No. PCT/CN2020/088324, filed on Apr. 30, 2020.

(30) Foreign Application Priority Data

May 6, 2019   (CN) .......................... 201910372616.4

(51) Int. Cl.
*H05K 5/00* (2006.01)
*G06F 1/16* (2006.01)

(52) U.S. Cl.
CPC ......... *H05K 5/0017* (2013.01); *G06F 1/1601* (2013.01); *G06F 1/1626* (2013.01)

(58) Field of Classification Search
CPC ... H05K 5/0017; G06F 1/1601; G06F 1/1626; G06F 1/1637; H04M 1/0269; H04M 1/0202; H04M 1/0266; G09F 9/301; G09F 9/33; G09F 9/35
USPC .......................................................... 361/807
See application file for complete search history.

(56) References Cited

U.S. PATENT DOCUMENTS

| | | | |
|---|---|---|---|
| 10,431,887 B2 * | 10/2019 | Kim | H05K 1/181 |
| 2011/0186325 A1 | 8/2011 | Myers et al. | |
| 2014/0321072 A1 | 10/2014 | Cavallaro et al. | |
| 2016/0233037 A1 * | 8/2016 | Lee | H01H 13/705 |
| 2016/0234361 A1 | 8/2016 | Baek et al. | |
| 2017/0310798 A1 * | 10/2017 | Song | G06F 1/1652 |
| 2018/0164850 A1 | 6/2018 | Sim et al. | |
| 2018/0178483 A1 | 6/2018 | Chu et al. | |
| 2018/0331124 A1 | 11/2018 | Cho et al. | |
| 2018/0343755 A1 | 11/2018 | Park et al. | |
| 2019/0171254 A1 | 6/2019 | Kim et al. | |
| 2020/0176696 A1 | 6/2020 | Dai | |

(Continued)

FOREIGN PATENT DOCUMENTS

| | | |
|---|---|---|
| AU | 2016216322 A1 | 8/2017 |
| CN | 106444985 A | 2/2017 |
| CN | 108183980 A | 6/2018 |

(Continued)

*Primary Examiner* — Zhengfu J Feng
(74) *Attorney, Agent, or Firm* — Conley Rose, P.C.

(57) ABSTRACT

An electronic device has a curved screen. An arc-shaped transition edge is disposed on both sides of a corner of the curved screen, and a black border is bent to a side surface of the electronic device, so that a full-screen effect without a black border is achieved, and the fringe of the curved screen is continuous and smooth as a whole.

14 Claims, 8 Drawing Sheets

(56) References Cited

U.S. PATENT DOCUMENTS

2020/0235463 A1* 7/2020 Cha ..................... H01Q 1/2266
2021/0320275 A1* 10/2021 Cho ..................... G06F 1/1626

FOREIGN PATENT DOCUMENTS

| CN | 108766977 A | 11/2018 |
| CN | 108873510 A | 11/2018 |
| CN | 108932907 A | 12/2018 |
| CN | 109671358 A | 4/2019 |
| CN | 107784940 B | 11/2019 |
| CN | 111048699 A | 4/2020 |
| CN | 108241226 B | 8/2021 |
| JP | 2013519151 A | 5/2013 |

* cited by examiner

ELECTRONIC DEVICE WITH CURVED SCREEN

CROSS-REFERENCE TO RELATED APPLICATIONS

This application is a continuation of International Patent Application No. PCT/CN2020/088324, filed on Apr. 30, 2020, which claims priority to Chinese Patent Application No. 201910372616.4, filed on May 6, 2019. The disclosures of the aforementioned applications are hereby incorporated by reference in their entireties.

TECHNICAL FIELD

This application relates to the field of electronics and communications technologies, and in particular, to the field of screen technologies.

BACKGROUND

Generally, screens are disposed for current electronic devices such as a television set, a smart screen, a wearable device, and a personal mobile terminal. The screen is an important window for presenting information such as an image to a user. As shown in FIG. 1, a black border exists in a fringe part of the screen.

The black border is a cabling region of the screen, and cannot display an image, but occupies a specific area on a surface of the screen. Generally, to pursue better visual experience, the user expects that an area of a part that is of the electronic device and that can display an image is as large as possible. Generally, the cabling region of the screen cannot be removed. Therefore, how to improve visual experience of the user in a case of a black border is an urgent problem to be resolved at present.

SUMMARY

In view of this, embodiments of this application provide a curved screen and an electronic device with a curved screen, to improve visual experience of a user.

According to a first aspect, this application provides an embodiment of a curved screen assembly. The curved screen assembly includes a curved screen and a cover panel attached to the curved screen, where the curved screen includes a main display panel and a plurality of side display panels. The cover panel is in a box-shaped structure, the main display panel is attached to a bottom surface of the box-shaped structure, and the side display panel is attached to a side surface of the box-shaped structure. Additionally, the curved screen is in a form of a closed round or quasi-round polygon as a whole in a direction perpendicular to the bottom surface.

A fringe part of the screen is bent, such that a majority of a cabling region is located on a side surface of the electronic device, to reduce an area occupied by the cabling region on a main surface. In this way, an area of a region that can be used for display on the main surface can be increased, thereby improving customer experience.

In an embodiment of the curved screen assembly, an edge of the main display panel is a straight edge, the main display panel has a plurality of straight edges, a part at which two adjacent straight edges intersect is a corner. Each straight edge is correspondingly connected to one side display panel, where an edge that is of the side display panel and that intersects with the straight edge is an inner edge, and where there is also an outer edge at the fringe of the side display panel. The outer edge is located at the fringe of the curved screen, both the inner edge and the outer edge are connected to the corner of the main display panel, and a segment connecting the outer edge and the corner is an arc-shaped transition edge.

The part connecting the outer edge of the side display panel and the corner is an arc-shaped transition edge, such that when the side display panel is bent to the side surface of the electronic device, the corner is quite stretched, causing no fold. In addition, transition of the arc-shaped transition edge is visually natural, such that a fringe line of the main display panel is smooth, thereby improving use experience.

In an embodiment of the curved screen assembly (this embodiment may be combined with any one or more of the foregoing embodiments of the curved screen), for any corner of the main display panel, bending radians of an arc-shaped transition edge on both sides of the corner are unequal.

In an embodiment of the curved screen assembly (this embodiment may be combined with any one or more of the foregoing embodiments of the curved screen), radians of all parts of the arc-shaped transition edge are unequal.

In an embodiment of the curved screen assembly (this embodiment may be combined with any one or more of the foregoing embodiments of the curved screen), the arc-shaped transition edge is presented as one arc on each reference cross section, and the reference cross section is a cross section perpendicular to a thickness direction of the side display panel.

In an embodiment of the curved screen assembly (this embodiment may be combined with any one or more of the foregoing embodiments of the curved screen), radians of all parts of an arc that is of the arc-shaped transition edge and that is located on one reference cross section are unequal.

In an embodiment of the curved screen assembly (this embodiment may be combined with any one or more of the foregoing embodiments of the curved screen), radians of arcs of the arc-shaped transition edge that are located on different reference cross sections are unequal.

In an embodiment of the curved screen assembly (this embodiment may be combined with any one or more of the foregoing embodiments of the curved screen), the main display panel is in a panel shape of a rectangle. The main display panel in the panel shape of a rectangle has four straight edges, two opposite straight edges fall into one group, side display panels connected to one group of straight edges are symmetrically disposed, and side display panels connected to the other group of straight edges are asymmetrically disposed.

In an embodiment of the curved screen assembly (this embodiment may be combined with any one or more of the foregoing embodiments of the curved screen), the main display panel is in a panel shape of a symmetric polygon, a cross section of the curved screen at a center position in a width direction is a first screen cross section, and a cross section of the curved screen at a center position in a length direction is a second screen cross section. The curved screen may have the following overall forms.

Form 1: Parts of the side display panel that are located on both sides of the first screen cross section are symmetrical with respect to the first screen cross section, and parts of the side display panel that are located on both sides of the second screen cross section are symmetrical with respect to the second screen cross section.

Form 2: Parts of the side display panel that are located on both sides of the first screen cross section are asymmetrical with respect to the first screen cross section, and parts of the side display panel that are located on both sides of the second screen cross section are symmetrical with respect to the second screen cross section.

Form 3: Parts of the side display panel that are located on both sides of the first screen cross section are symmetrical with respect to the first screen cross section, and parts of the side display panel that are located on both sides of the second screen cross section are asymmetrical with respect to the second screen cross section.

Form 4: Parts of the side display panel that are located on both sides of the first screen cross section are asymmetrical with respect to the first screen cross section, and parts of the side display panel that are located on both sides of the second screen cross section are asymmetrical with respect to the second screen cross section.

Form 5: Parts of the main display panel that are located on both sides of the first screen cross section are symmetrical with respect to the first screen cross section, and parts of the main display panel that are located on both sides of the second screen cross section are symmetrical with respect to the second screen cross section.

Form 6: Parts of the main display panel that are located on both sides of the first screen cross section are asymmetrical with respect to the first screen cross section, and parts of the main display panel that are located on both sides of the second screen cross section are symmetrical with respect to the second screen cross section.

Form 7: Parts of the main display panel that are located on both sides of the first screen cross section are symmetrical with respect to the first screen cross section, and parts of the main display panel that are located on both sides of the second screen cross section are asymmetrical with respect to the second screen cross section.

Form 8: Parts of the main display panel that are located on both sides of the first screen cross section are asymmetrical with respect to the first screen cross section, and parts of the main display panel that are located on both sides of the second screen cross section are asymmetrical with respect to the second screen cross section.

According to a second aspect, this application further provides an embodiment of an electronic device. The electronic device includes a cover panel, a middle frame component, a rear housing, a circuit board, a power module, and a curved screen. The middle frame component is in a frame-shaped structure, the cover panel and the rear housing are separately fixed on both sides of the middle frame component, a housing of the electronic device is enclosed by the middle frame component, the cover panel, and the rear housing together, and the circuit board and the power module are disposed in the housing of the electronic device. The power module is configured to supply power to the curved screen and the circuit board. A working circuit is disposed in the circuit board, and the working circuit is configured to send a display instruction to the curved screen. The curved screen includes a main display panel and a plurality of side display panels, and the curved screen is attached to the cover panel. A largest display surface presenting content to a user during use of the electronic device is a main surface, and one or more surfaces connected to the fringe of the main surface are side surfaces. The main display panel of the curved screen is located on the main surface of the electronic device, and the side display panel of the curved screen is located on the side surface of the electronic device. The main display panel is a polygon, and the curved screen is in a form of a closed round or quasi-round polygon as a whole in a direction perpendicular to the main surface.

In the embodiment of the electronic device in the second aspect, various implementations of the curved screen and the cover panel in the curved screen assembly in the first aspect may be used for the curved screen and the cover panel.

In a first possible implementation of the second aspect, the cover panel includes a bottom panel, round corners, and side panels. There are a plurality of straight edges at the fringe of the bottom panel. The side panel is connected to the straight edge of the bottom panel, and a position at which adjacent straight edges of the bottom panel intersect is connected to the round corner. The round corner is in a three-dimensional arc-shaped structure, and both sides of the round corner are connected to the side panel. The side display panel is attached to the side panel of the cover panel, the main display panel is attached to the bottom panel of the cover panel, and the corner is attached to the position at which two adjacent straight edges of the bottom panel intersect. The middle frame component includes a plurality of slender side edges, the plurality of slender side edges are connected together to form a frame, and the side panel of the cover panel and the side edge of the middle frame component are assembled together.

With reference to the second aspect or the first possible implementation of the second aspect, in a second possible implementation, a width of the side panel of the cover panel is equal to or greater than a width of the side display panel.

With reference to any one of the second aspect and the first and the second possible implementations of the second aspect, in a third possible implementation, an inner surface of the round corner is an arc surface, and an outer surface of the round corner is also an arc surface.

The corner is attached to the position at which two adjacent straight edges of the bottom panel intersect, such that the corner is located on the main surface of the electronic device. In other words, the corner of the main display panel is not attached to the inner surface of the round corner, and the corner is not bent as the inner surface of the round corner is bent, thereby preventing the corner of the main display panel from being bent in two directions if the inner surface of the round corner is bent in the two directions at the same time.

With reference to any one of the second aspect and the first to the third possible implementations of the second aspect, in a fourth possible implementation, radians of all parts of the arc surface of the inner surface of the round corner may be unequal. For example, a radian of a center position is small, and a radian of a fringe position is large, or a radian of a center position is large, and a radian of a fringe position is small.

With reference to any one of the second aspect and the first to the third possible implementations of the second aspect, in a fifth possible implementation, radians of all parts of the arc surface of the outer surface of the round corner may be unequal. For example, a radian of a center position is small, and a radian of a fringe position is large, or a radian of a center position is large, and a radian of a fringe position is small.

With reference to any one of the second aspect and the first to the fifth possible implementations of the second aspect, in a sixth possible implementation, a cross section of a position of the round corner in a direction parallel to an inner surface or an outer surface of the bottom panel is a first round corner cross section. Additionally, the outer surface of the round corner is presented as one arc on each first round corner cross section, and the inner surface of the round corner is presented as one arc on each first round corner cross section.

With reference to any one of the second aspect and the first to the sixth possible implementations of the second aspect, in a seventh possible implementation, cross sections of the position of the round corner that are separately perpendicular to two straight edges connected to the round corner are a second round corner cross section and a third round corner cross section. The outer surface of the round corner is presented as one arc on each second round corner cross section, the inner surface of the round corner is presented as one arc on each second round corner cross section, the outer surface of the round corner is presented as one arc on each third round corner cross section, and the inner surface of the round corner is presented as one arc on each third round corner cross section.

With reference to any one of the second aspect and the first to the seventh possible implementations of the second aspect, in an eighth possible implementation, for a cover panel with a rectangular bottom panel, the bottom panel has four straight edges, where two opposite straight edges fall into one group. Side panels connected to one group of straight edges may be symmetrically disposed, and side panels connected to the other group of straight edges are asymmetrically disposed.

In a ninth possible implementation of the second aspect, the middle frame component includes wrap corners and wrap edges, the middle frame component is in a frame-shaped structure, the wrap corner is located at a corner position of the frame-shaped structure, the wrap edge is connected between adjacent wrap corners, and the wrap corner is in a three-dimensional arc-shaped structure. The cover panel includes a bottom wall and a plurality of side walls, there are a plurality of straight edges at the fringe of the bottom wall, each straight edge of the bottom wall is correspondingly connected to one side wall, and a part at which two adjacent straight edges of the bottom wall intersect is a cover panel corner. There is a cover panel inner edge and a cover panel outer edge at the fringe of the side wall. The cover panel inner edge is connected to the straight edge of the bottom wall, the cover panel outer edge is located at the fringe of the cover panel, and both the cover panel inner edge and the cover panel outer edge of the side wall are connected to the cover panel corner. A segment connecting the cover panel outer edge and the cover panel corner is an arc-shaped transition edge. The main display panel is attached to the bottom wall of the cover panel, the side display panel is attached to the side wall of the cover panel, the corner of the main display panel is located at a position of the cover panel corner, the wrap corner of the middle frame component is fastened to the cover panel corner of the cover panel, and the wrap edge of the middle frame component is fastened to the side wall of the cover panel.

With reference to the second aspect or the ninth possible implementation of the second aspect, in a tenth possible implementation, a width of the side wall of the cover panel is equal to or greater than a width of the side display panel.

With reference to any one of the second aspect and the ninth and the tenth possible implementations of the second aspect, in an eleventh possible implementation, an inner surface of the wrap corner is an arc surface, and an outer surface of the wrap corner is also an arc surface.

With reference to any one of the second aspect and the ninth to the eleventh possible implementations of the second aspect, in a twelfth possible implementation, radians of all parts of the inner surface of the wrap corner may be unequal.

For example, a radian of a center position is small, and a radian of a fringe position is large, or a radian of a center position is large, and a radian of a fringe position is small.

With reference to any one of the second aspect and the ninth to the eleventh possible implementations of the second aspect, in a thirteenth possible implementation, radians of all parts of the outer surface of the wrap corner may be unequal. For example, a radian of a center position is small, and a radian of a fringe position is large, or a radian of a center position is large, and a radian of a fringe position is small.

With reference to any one of the second aspect and the ninth to the thirteenth possible implementations of the second aspect, in a fourteenth possible implementation, a cross section of a position of the wrap corner in a direction parallel to the main surface of the electronic device is a first wrap corner cross section. Additionally, the outer surface of the wrap corner is presented as one arc on each first wrap corner cross section, the inner surface of the wrap corner is presented as one arc on each first wrap corner cross section.

With reference to any one of the second aspect and the ninth to the fourteenth possible implementations of the second aspect, in a fifteenth possible implementation, cross sections of the position of the wrap corner that are separately perpendicular to longitudinal directions of two wrap edges connected to the wrap corner are a second wrap corner cross section and a third wrap corner cross section. The outer surface of the wrap corner is presented as one arc on each second wrap corner cross section, the inner surface of the wrap corner is presented as one arc on each second wrap corner cross section, the outer surface of the wrap corner is presented as one arc on each third wrap corner cross section, and the inner surface of the wrap corner is presented as one arc on each third wrap corner cross section.

With reference to any one of the second aspect and the ninth to the fifteenth possible implementations of the second aspect, in a sixteenth possible implementation, for any cover panel corner of the bottom wall, bending radians of an arc-shaped transition edge on both sides of the cover panel corner are unequal.

With reference to any one of the second aspect and the ninth to the sixteenth possible implementations of the second aspect, in a seventeenth possible implementation, radians of all parts of the arc-shaped transition edge are unequal.

With reference to any one of the second aspect and the ninth to the seventeenth possible implementations of the second aspect, in an eighteenth possible implementation, the arc-shaped transition edge is presented as one arc on each first cross section, and the first cross section is a cross section perpendicular to a thickness direction of the side wall.

With reference to any one of the second aspect and the ninth to the seventeenth possible implementations of the second aspect, in a nineteenth possible implementation, the arc-shaped transition edge is presented as one arc on each first cross section, the first cross section is a cross section perpendicular to a thickness direction of the side wall, and radians of all parts of an arc that is of the arc-shaped transition edge and that is located on one first cross section are unequal.

With reference to any one of the second aspect and the ninth to the nineteenth possible implementations of the second aspect, in a twentieth possible implementation, the arc-shaped transition edge is presented as one arc on each first cross section, the first cross section is a cross section perpendicular to the thickness direction of the side wall, and radians of arcs of the arc-shaped transition edge that are located on different first cross sections may be unequal.

With reference to any one of the second aspect and the ninth to the twentieth possible implementations of the second aspect, in a twenty-first possible implementation, for a cover panel with a rectangular bottom wall, the bottom wall has four straight edges, where two opposite straight edges fall into one group. Further, side walls connected to one group of straight edges may be symmetrically disposed, and side walls connected to the other group of straight edges may be asymmetrically disposed.

With reference to any one of the second aspect and the first to the twenty-first possible implementations of the second aspect, in a twenty-second possible implementation, when the curved screen is in a working state, the main display panel is configured to display corresponding content according to the display instruction.

With reference to any one of the second aspect and the first to the twenty-second possible implementations of the second aspect, in a twenty-third possible implementation, the main surface is a polygon and has a plurality of straight edges. A position at which two adjacent straight edges intersect is a corner, and when the curved screen is in the working state, a position of the straight edge of the main surface has no black border or has a black border only in the corner.

With reference to any one of the second aspect and the first to the twenty-third possible implementations of the second aspect, in a twenty-fourth possible implementation, there is no gap in the corner of the main display panel.

Figure 1:
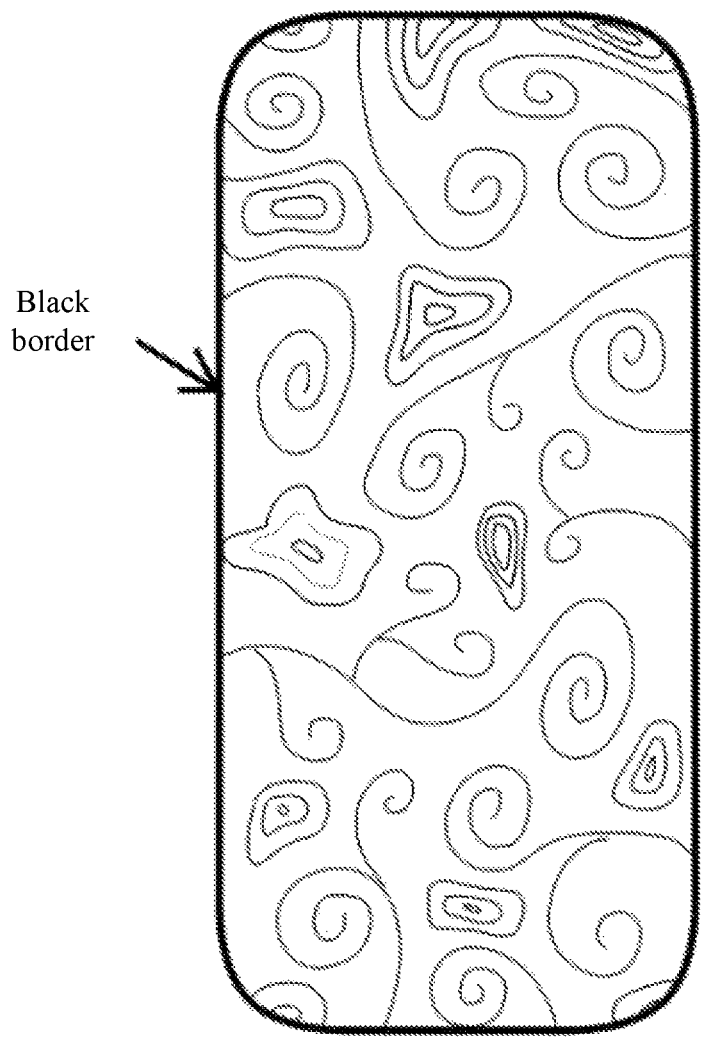
FIG. 1 is a schematic diagram of a black border of a screen in other approaches.

Reference numerals of elements in the accompanying drawings are as follows.
Curved screen 1
Main display panel 11
Straight edge 111
Corner 112
Side display panel 12
Inner edge 121
Outer edge 122
Cover panel 2
Bottom panel 21
Straight edge 211
Side panel 22
Round corner 23
Bottom wall 24
Straight edge 241
Cover panel corner 242
Side wall 25
Cover panel inner edge 251
Cover panel outer edge 252
Middle frame component 3
Side edge 31
Wrap corner 32
Wrap edge 33
Rear housing 4

DESCRIPTION OF EMBODIMENTS

The embodiments of this application may be applied to various electronic devices with screens. The electronic device may be a television set, a smart screen, a wearable device, an in-vehicle terminal, a personal mobile terminal, a personal computer, a multimedia player, an electronic reader, a smart home device, a robot, or the like. The personal mobile terminal may also be a smartphone, a tablet computer, or the like. The wearable device may also be a smart band, an intelligent medical device, a head-mounted terminal, or the like. The head-mounted terminal may be a virtual reality terminal, an augmented reality terminal, or the like. The intelligent medical device may be an intelligent blood pressure measurement device, an intelligent blood sugar measurement device, or the like. The smart home device may be an intelligent access control system or the like. The robot may be any electronic device serving people according to instructions of the people.

Generally, there are three types of screens of electronic devices: a liquid crystal display (LCD), a rigid organic light-emitting display (OLED), and a flexible OLED.

The screen is attached to the inside of a cover panel. One side that is of the screen and that displays a pattern faces the cover panel. The cover panel is transparent, and the pattern displayed on the screen can be seen through the cover panel. As a housing of the electronic device, the cover panel is located on an outer surface of the electronic device. Alternatively, the screen may be attached to an outer surface of the cover panel.

In the embodiments of this application, a curved screen may be a flexible OLED. A width of a cabling region (namely, a black border) in a fringe part of the screen may be recognized by a naked eye, and cannot be ignored. For example, widths of black borders of some screens may reach 0.8 millimeters (mm).

An overall shape of the electronic device may be a flat panel, a column, a ball, a ring, a helmet, or the like. A largest display surface presenting content to a user during use of the electronic device is defined as a main surface, and one or more surfaces connected to the fringe of the main surface are defined as side surfaces. An included angle between the main surface and the side surface ranges from 80 degrees to 150 degrees, for example, 90 degrees. The main surface is a polygon, and has a plurality of straight edges, and a position at which two adjacent straight edges intersect is a corner.

In the embodiments of this application, the fringe part of the screen is bent, such that a majority of the cabling region is located on the side surface of the electronic device, to reduce an area occupied by the cabling region on the main surface. In this way, an area of a region that can be used for display on the main surface can be increased, thereby improving customer experience.

Figure 2:
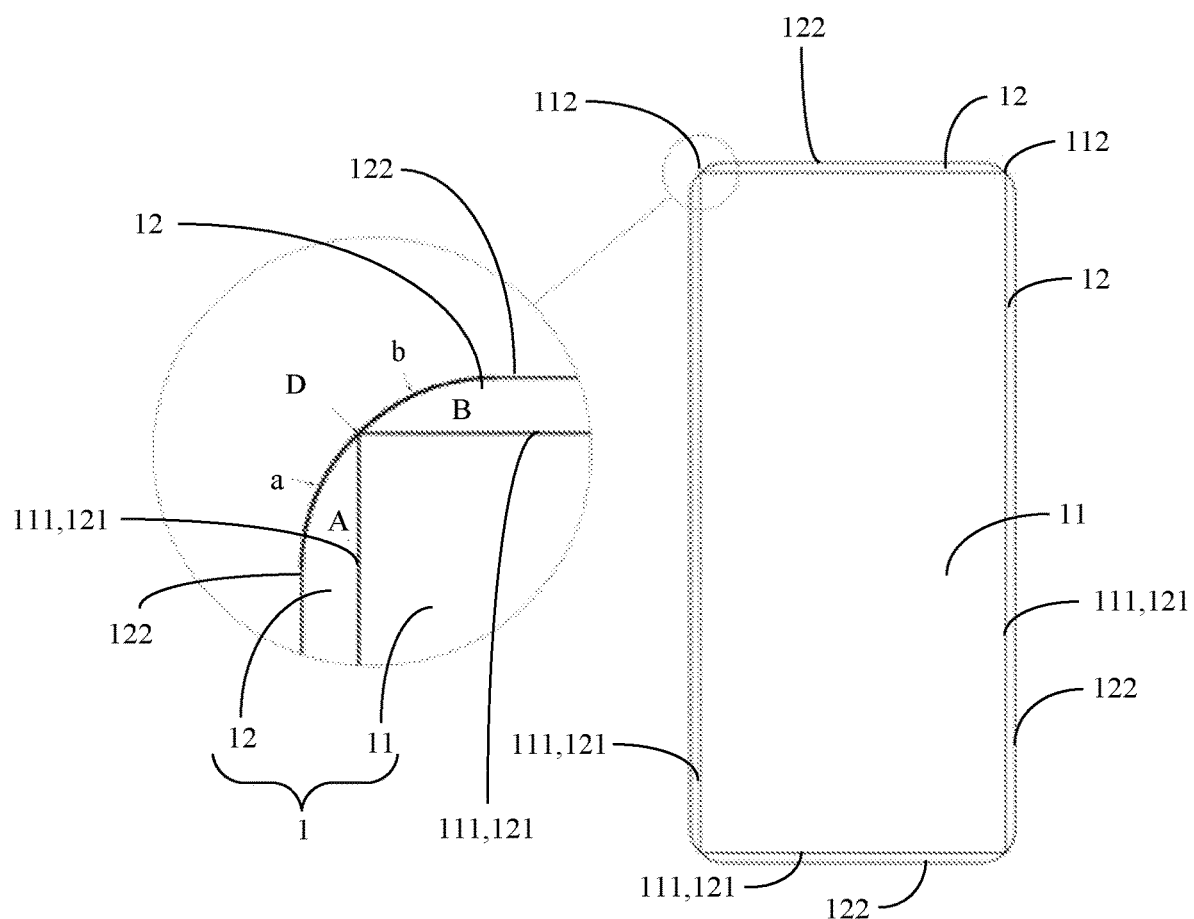
FIG. 2 is a schematic diagram of a main display panel and a side display panel of a curved screen according to an embodiment of this application.
Figure 3:
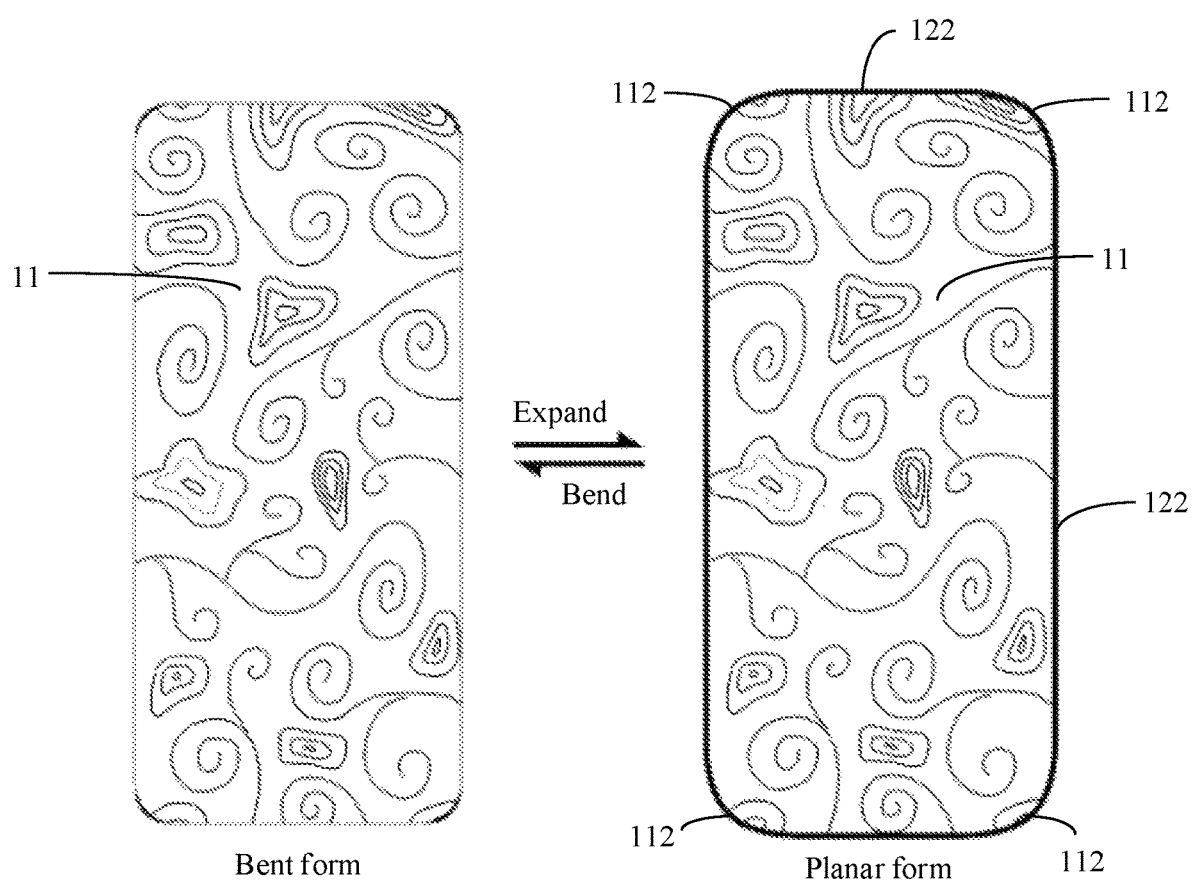
FIG. 3 is a schematic diagram of an unbent state and a bent state of a side display panel of a curved screen according to an embodiment of this application.

As shown in FIG. 2 and FIG. 3, a curved screen 1 includes a main display panel 11 and a plurality of side display panels 12, and the main display panel 11 is located on the main surface of the electronic device. The side display panel 12 shown in FIG. 2 is unbent to the side surface of the electronic device, and the curved screen 1 is in a flat panel-shaped structure as a whole. FIG. 3 shows two states. A view on the right shows a state in which the side display panel 12 is unbent to the side surface of the electronic device, and a view on the left shows a state in which the side display panel 12 is bent to the side surface of the electronic device. However, the states in the two views in FIG. 3 are seen from a direction perpendicular to the main display panel 11. After the side display panel 12 is bent to the side surface of the electronic device, an included angle between the main display panel 11 and the side display panel 12 ranges from 80 degrees to 150 degrees, for example, 90 degrees. The main display panel 11 may be used to display an image, and the side display panel 12 is not used to display an image. Certainly, alternatively, both the main display panel 11 and the side display panel 12 may be used to display an image.

The cover panel 2 may be disposed in a box-shaped structure, the main display panel 11 is attached to a bottom surface of the box-shaped structure, and the side display panel 12 is attached to a side surface of the box-shaped structure. When the bottom surface of the cover panel 2 is a polygon, from the outside of the cover panel, the curved screen 1 located on the inside of the cover panel 2 is in a form of a closed round or quasi-round polygon as a whole in a direction perpendicular to the bottom surface of the cover panel 2. When the bottom surface of the cover panel 2 is a rectangle, from the outside of the cover panel 2, the curved screen 1 located on the inside of the cover panel 2 is in a form of a closed round or quasi-round rectangle as a whole in a direction perpendicular to the bottom surface of the cover panel 2. In other words, when the bottom surface of the cover panel 2 is a polygon, the curved screen 1 is in the form of a closed round or quasi-round polygon as a whole in the direction perpendicular to the bottom surface. When the bottom surface of the cover panel 2 is a rectangle, the curved screen 1 is in the form of a closed round or quasi-round rectangle as a whole in the direction perpendicular to the bottom surface. A shape and dimensions of the bottom surface of the cover panel 2 are basically the same as those of the main display panel 11.

Referring to FIG. 2, an edge of the main display panel 11 is a straight edge 111, the main display panel has a plurality of straight edges 111, and a part at which two adjacent straight edges 111 intersect is a corner 112. FIG. 2 provides a partial enlarged view of a region near the corner 112. A position denoted by D is the corner, and two parts A and B are side display panels 12.

Each straight edge 111 of the main display panel 11 is correspondingly connected to one side display panel 12. An edge that is of the side display panel and that intersects with the straight edge is an inner edge, and a position at which the side display panel 12 is connected to the straight edge 111 may be disposed in a form of a connection using an arc-shaped chamfer.

There is the inner edge 121 and an outer edge 122 at the fringe of the side display panel 12. The outer edge 122 is located at the fringe of the curved screen 1, both the inner edge 121 and the outer edge 122 of the side display panel 12 are connected to the corner 112 of the main display panel 11, and a segment connecting the outer edge 122 and the corner 112 is an arc-shaped transition edge. The inner edge 121 may be a straight edge, or may be a curved edge. A part that is of the outer edge 122 and that is located between two arc-shaped transition edges may be disposed parallel to the inner edge 121, or a part that is of the outer edge 122 and that is located between two arc-shaped transition edges may not be disposed parallel to the inner edge 121.

For any corner 112 of the main display panel 11, bending radians of an arc-shaped transition edge on both sides of the corner 112 may be equal or unequal.

In the partial enlarged view in FIG. 2, a part denoted by a and b is the arc-shaped transition edge, radians of all parts of the arc-shaped transition edge may be equal, or radians of all parts of the arc-shaped transition edge may be unequal.

Because the curved screen 1 has a specific thickness, the arc-shaped transition edge a and b in FIG. 2 is presented as one arc on each reference cross section. The reference cross section is a cross section perpendicular to a thickness direction of the side display panel 12. Radians of all parts of an arc that is of the arc-shaped transition edge and that is located on one reference cross section may be equal or unequal. Radians of arcs of the arc-shaped transition edge that are located on different reference cross sections may be equal or unequal.

The straight edge 111 of the main display panel 11 is an edge extending along a straight line. The straight edge 111 is an edge that extends along a straight line from a perspective of a naked eye, but may bend to a specific extent or have a specific radian from a microscopic perspective.

As shown in FIG. 3, a pattern is displayed on the curved screen in the figure. The view on the left shows that after the side display panel 12 is bent to the side surface of the electronic device, a black border exists only in the corner 112 of the main display panel 11 on the main surface of the electronic device, and there is no black border at another position. In the embodiment depicted in FIG. 3, the position at which the straight edge 111 of the main display panel 11 is connected to the side display panel 12 is in the form of a connection using an arc-shaped chamfer. Therefore, the straight edge 111 and the corner 112 are not shown in the view on the left in FIG. 3.

In addition, it can be learned from FIG. 3 that the part connecting the outer edge 122 of the side display panel 12 and the corner 112 is an arc-shaped transition edge, such that when the side display panel 12 is bent to the side surface of the electronic device, the corner 112 is quite stretched, causing no fold. In addition, there is no gap in the corner of the main display panel 12. Transition of the arc-shaped transition edge is visually natural, such that a fringe line of the main display panel 11 is smooth, thereby improving use experience. Although the screen can be curved, due to a technical limitation, the screen can be bent only in one direction, and cannot be bent in two or more directions at the same time. Therefore, if processing is improper, a fold tends to occur in a corner. In this embodiment, the side display panel 12 is bent along a straight edge, and because the corner is already the most marginal part, and the part connecting the outer edge of the side display panel 12 and the corner is an arc-shaped transition edge, no fold occurs.

Figure 4:
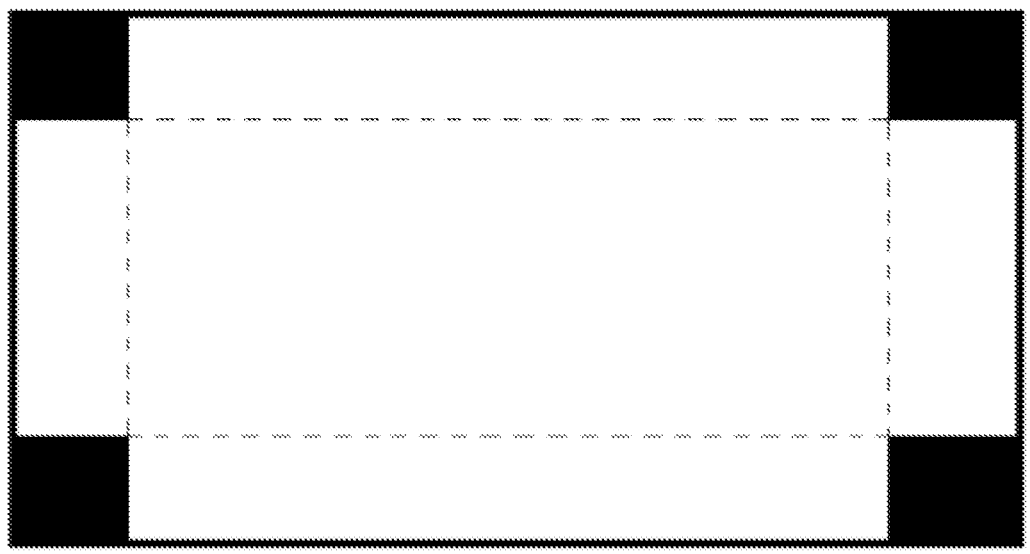
FIG. 4 and FIG. 5 show a state in which four fringe parts are bent in an example of folding paper to illustrate that a fold tends to occur in a corner when a side display panel is bent.
Figure 5:
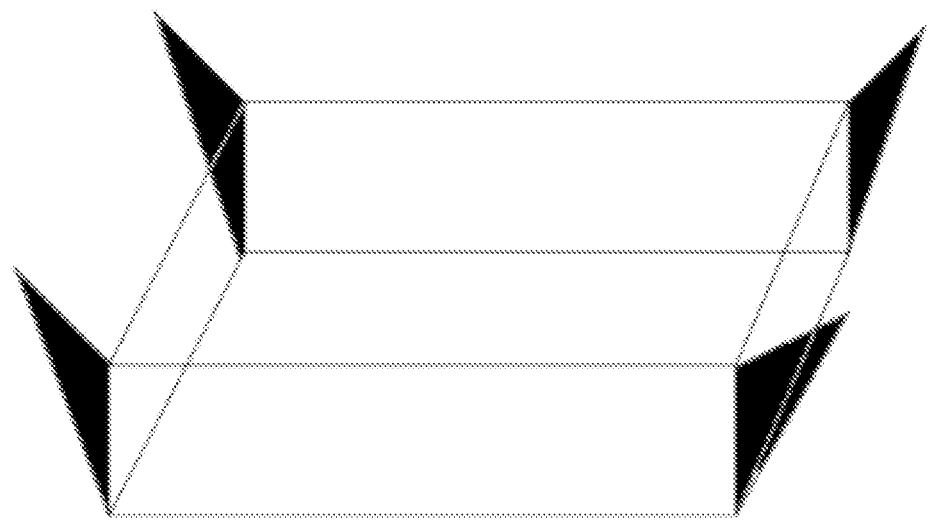

Why stacking and a fold tend to occur in the corner when the side display panel 12 is bent may be explained using a piece of paper. As shown in FIG. 4 and FIG. 5, FIG. 4 shows that four edges of a piece of paper are bent along dashed lines in one direction. It is found that there is extra paper in the corner. The extra paper is paper in black. The extra paper is stacked together, causing folds.

In the embodiments of this application, as shown in FIG. 2, when the parts A and B are bent along the straight edge 111, because the point D is connected to an arc-shaped edge, there is no part protruding from the outside of the point D. Therefore, no fold is caused at the point D.

Figure 7:
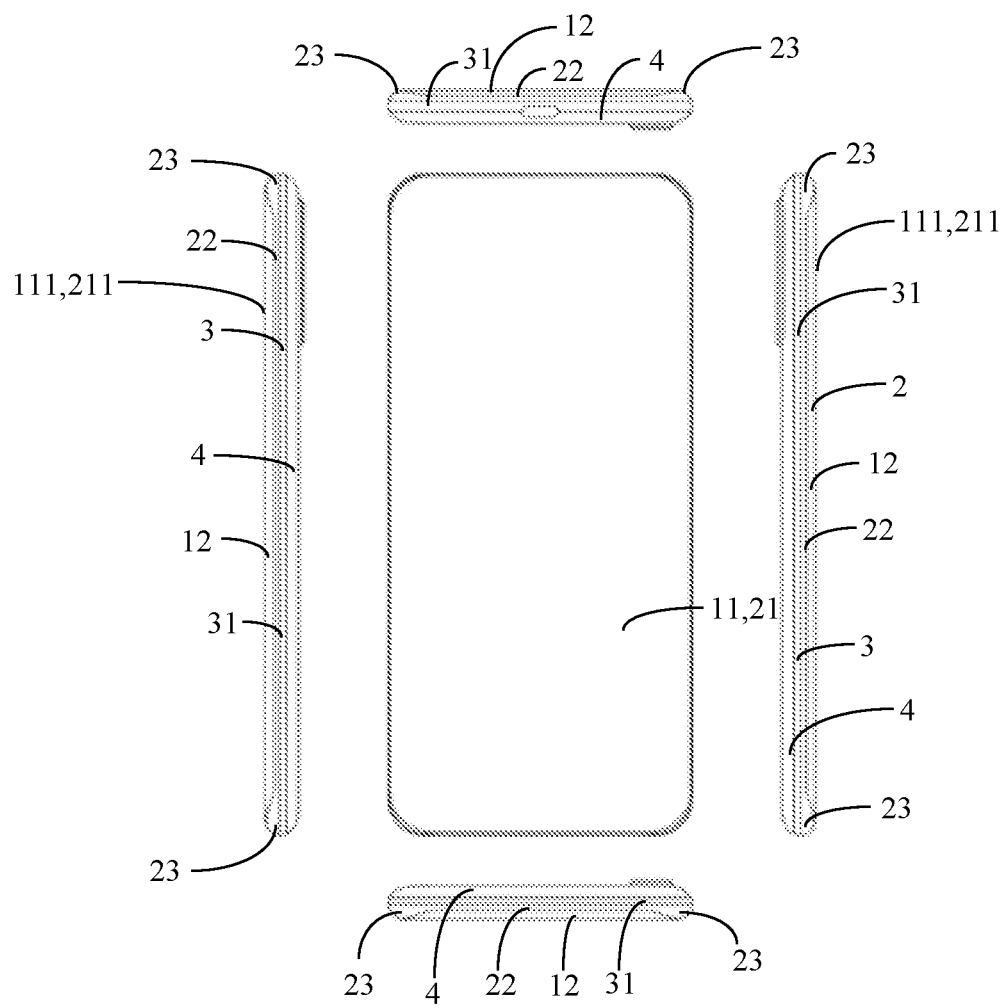
FIG. 7 is a schematic diagram of assembling a curved screen, a cover panel, and a middle frame component into an electronic device according to an embodiment of this application, where a main view, a bottom view, a top view, a left view, and a right view are included.
Figure 9:
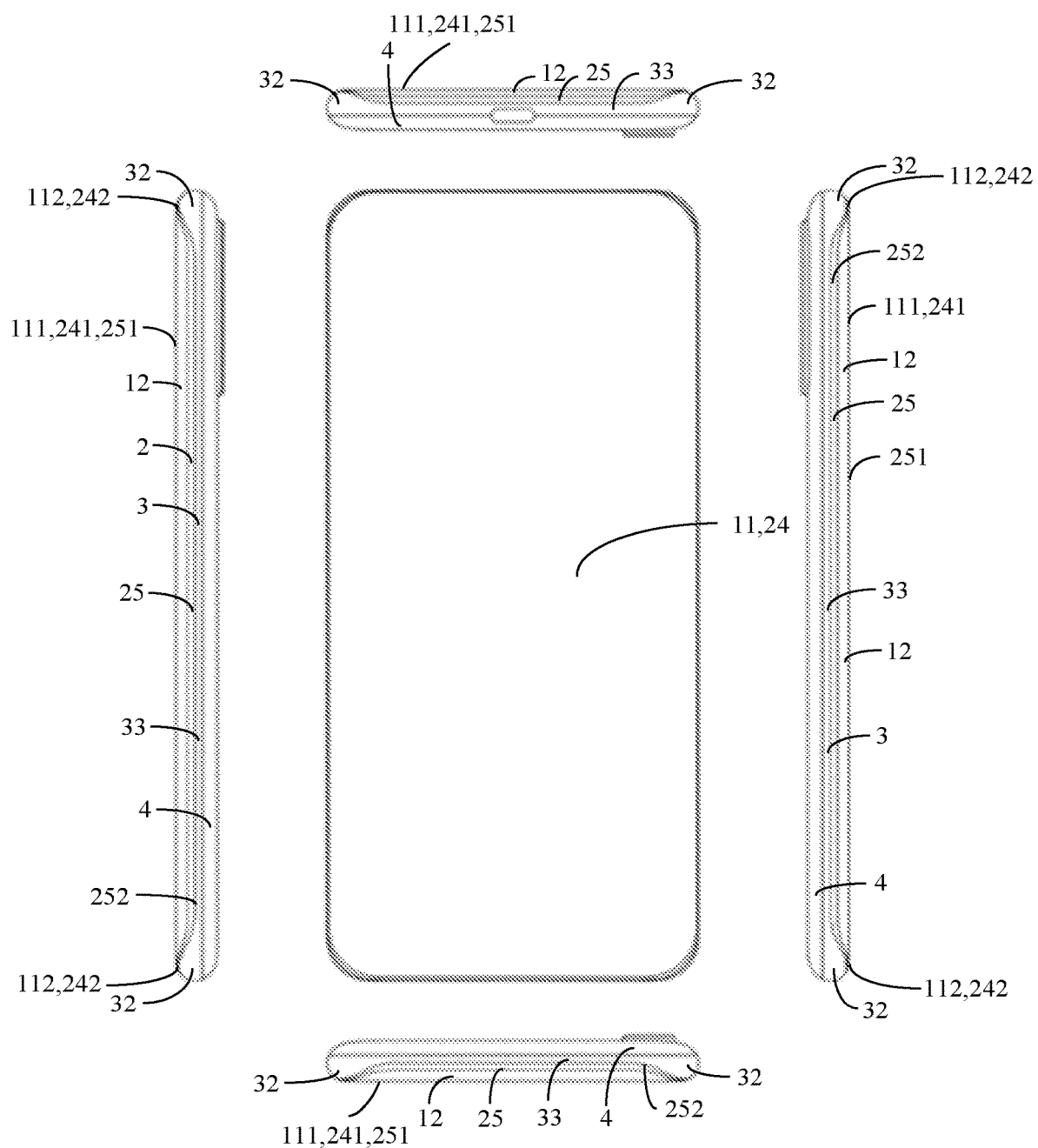
FIG. 9 is a schematic diagram of another implementation of assembling a curved screen, a cover panel, and a middle frame component into an electronic device according to an embodiment of this application, where a main view, a bottom view, a top view, a left view, and a right view are included.

FIG. 7 and FIG. 9 show states in which the curved screen 1 is installed on the electronic device. The side display panel 12 on the periphery of the main display panel 11 is bent to the side surface of the electronic device. In this case, a black border located on the side display panel 12 is located on the side surface of the electronic device, and only a black border at a position of the corner 112 of the main display panel 11 is located on the main surface of the electronic device. However, because the position of the corner 112 is quite small, the black border in the corner 112 is also quite small. If only the main display panel 11 on the main surface of the electronic device is used to display an image, basically, no black border can be seen on the main surface of the electronic device, and a full screen is basically implemented on the main surface. In other words, basically, only a region that can be used for display exists on the curved screen on the main surface, and a black border that cannot be used for display can hardly be seen.

The curved screen 1 has an arc-shaped transition edge on both sides of the corner 112. Therefore, in a direction perpendicular to the main surface of the electronic device, a fringe line of the curved screen 1 is complete and continuous, transition is natural, and the line is stretched and smooth. When the main display panel 11 is a polygon, from the outside of the electronic device, the curved screen 1 located on the inside of the cover panel 2 is in the form of a closed round or quasi-round polygon as a whole in the direction perpendicular to the main surface of the electronic device. When the main display panel 11 is a rectangle, from the outside of the electronic device, the curved screen 1 located on the inside of the cover panel 2 is in the form of a closed round or quasi-round rectangle as a whole in the direction perpendicular to the main surface of the electronic device. In other words, when the main display panel 11 is a polygon, the curved screen 1 is in the form of a closed round or quasi-round polygon as a whole in the direction perpendicular to the main surface. When the main display panel 11 is a rectangle, the curved screen 1 is in the form of a closed round or quasi-round rectangle as a whole in the direction perpendicular to the main surface. The main display panel 11 may be in a panel shape of a polygon. In some aspects, the main display panel 11 may be in a panel shape of a symmetric polygon, for example, a panel shape of a rectangle or a hexagon.

For a curved screen whose side display panel has been bent to a side surface of an electronic device, a rectangular main display panel has four straight edges, and two opposite straight edges fall into one group. Side display panels connected to one group of straight edges may be symmetrically disposed, and side display panels connected to the other group of straight edges may be symmetrically disposed, or may be asymmetrically disposed.

FIG. 7 and FIG. 9 show a complete electronic device. A middle frame component 3 is usually disposed on the electronic device, and the middle frame component 3 is used to fasten the cover panel 2 and a rear housing 4 of the electronic device. The middle frame component 3 is in a frame-shaped structure, the cover panel 2 and the rear housing 4 are separately fastened on both sides of the middle frame component 3, and a housing of the electronic device is enclosed by the middle frame component 3, the cover panel 2, and the rear housing 4 together. A circuit board and a power module are disposed in the housing of the electronic device. The power module is configured to supply power to the curved screen and the circuit board, and a working circuit is disposed in the circuit board. The working circuit is configured to send a display instruction to the curved screen 1, and when the curved screen 1 is in a working state, the main display panel 11 displays corresponding content according to the display instruction. When the curved screen 1 is in the working state, the side display panel 12 may also display corresponding content according to the display instruction sent by the circuit board. When the curved screen 1 is in the working state, the main display panel 11 has a black border only in the corner. A position of the straight edge of the main surface has no black border or has a black border only in the corner.

The middle frame component 3 and the rear housing 4 may also be disposed as an integral structure.

A design form of the middle frame component 3 is usually related to a design form of the cover panel. The following describes two design forms of the middle frame component 3 and the cover panel 2 using two examples.

Form 1

Figure 6:
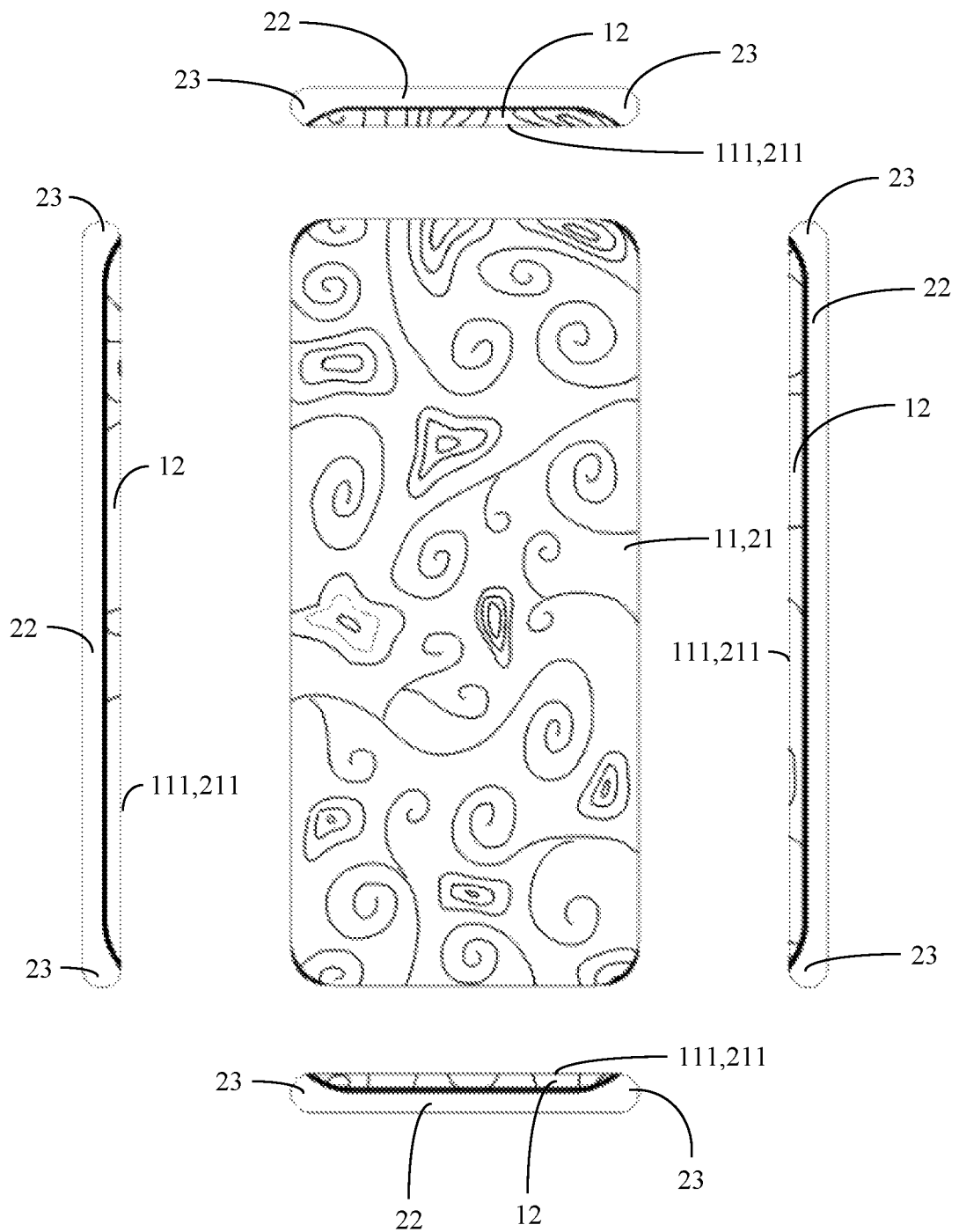
FIG. 6 is a schematic diagram of attaching a curved screen to the inside of a cover panel according to an embodiment of this application, where a main view, a bottom view, a top view, a left view, and a right view are included.

As shown in FIG. 6 and FIG. 7, a pattern exists on the curved screen in FIG. 6, and the curved screen has a black border. In FIG. 6, the curved screen is fastened to the inside of the cover panel 2. Therefore, the figure shows two components: the cover panel 2 and the curved screen 1. However, because the cover panel 2 is transparent, the curved screen 1 can still be seen from the outside of the cover panel 2. For ease of display, a main view, a top view, a bottom view, a left view, and a right view are shown in FIG. 6. FIG. 7 is an overall structural diagram of the electronic device, and the electronic device in the figure is a mobile phone. FIG. 7 shows a front view, a top view, a bottom view, a left view, and a right view of the electronic device. In FIG. 7, the curved screen, the cover panel 2, the middle frame component 3, and the rear housing 4 can be seen, and because the cover panel 2 is transparent, the curved screen 1 can be seen from the outside of the electronic device.

As shown in FIG. 6 and FIG. 7, the cover panel 2 includes a bottom panel 21, a round corner 23, and a side panel 22. There are a plurality of straight edges 211 at the fringe of the bottom panel 21, and the side panel 22 is connected to the straight edge 211 of the bottom panel 21. An included angle between the bottom panel 21 and the side panel 22 ranges from 80 degrees to 150 degrees, for example, 90 degrees. A position at which the side panel 22 is connected to the straight edge 211 of the bottom panel 21 may be disposed in the form of a connection using an arc-shaped chamfer. In the embodiments depicted in FIG. 6 and FIG. 7, the position at which the side panel 22 is connected to the straight edge 211 of the bottom panel 21 is in the form of a connection using an arc-shaped chamfer. Therefore, the straight edge 211 is not shown in the main views in FIG. 6 and FIG. 7, and the straight edge 211 can be seen in the top views, the bottom views, the left views, and the right views. Certainly, the straight edge 111 of the curved screen cannot be seen in the main views, either, and the straight edge 111 can be seen in the top views, the bottom views, the left views, and the right views.

A position at which adjacent straight edges 211 of the bottom panel 21 intersect is connected to the round corner 23, and the round corner 23 is in a three-dimensional arc-shaped structure. Both sides of the round corner 23 are connected to the side panel 22. An inner surface of the round corner 23 is an arc surface, and an outer surface of the round corner 23 is also an arc surface. However, radians of the arc surface of the inner surface and the arc surface of the outer surface may be equal or unequal. Radians of all parts of the arc surface of the inner surface of the round corner 23 may be equal. Alternatively, radians of all parts of the arc surface of the inner surface of the round corner 23 may be unequal. For example, a radian of a center position is small, and a radian of a fringe position is large, or a radian of a center position is large, and a radian of a fringe position is small. Radians of all parts of the arc surface of the outer surface of the round corner 23 may be equal. Alternatively, radians of all parts of the arc surface of the outer surface of the round corner 23 may be unequal. For example, a radian of a center position is small, and a radian of a fringe position is large, or a radian of a center position is large, and a radian of a fringe position is small.

A cross section of a position of the round corner 23 in a direction parallel to an inner surface or an outer surface of the bottom panel 21 is a first round corner cross section. Cross sections of the position of the round corner 23 that are separately perpendicular to two straight edges 211 connected to the round corner 23 are a second round corner cross section and a third round corner cross section.

The outer surface of the round corner 23 is presented as one arc on each first round corner cross section, and the inner surface of the round corner 23 is presented as one arc on each first round corner cross section. The outer surface of the round corner 23 is presented as one arc on each second round corner cross section, and the inner surface of the round corner 23 is presented as one arc on each second round corner cross section. The outer surface of the round corner 23 is presented as one arc on each third round corner cross section, and the inner surface of the round corner 23 is presented as one arc on each third round corner cross section.

As shown in FIG. 6, the curved screen is attached to the inside or the outside of the cover panel 2. For example, the side display panel 12 is attached to the inside or the outside of the side panel 22 of the cover panel 2, the main display panel 11 is attached to the inside or the outside of the bottom panel 21 of the cover panel 2, the corner 112 is attached to a position at which two adjacent straight edges 211 of the bottom panel 21 intersect, and the corner 112 is located on the main surface of the electronic device. In other words, the corner 112 of the main display panel 11 is not attached to the inner surface of the round corner 23, and the corner 112 is not bent as the inner surface of the round corner 23 is bent, thereby preventing the corner 112 of the main display panel 11 from being bent in two directions if the inner surface of the round corner 23 is bent in the two directions at the same time. A shape and dimensions of the bottom panel 21 of the cover panel 2 match those of the main display panel 11, such that the main display panel 11 exactly covers the entire bottom panel 21, and no part of the bottom panel 21 protrudes. For example, the shape and the dimensions of the bottom panel 21 of the cover panel 2 are basically the same as those of the main display panel 11.

A width of the side panel 22 of the cover panel 2 may be equal to a width of the side display panel 12.

As shown in FIG. 6 and FIG. 7, the width of the side panel 22 of the cover panel 2 may be greater than the width of the side display panel 12, and a fringe part of the side panel 22 of the cover panel 2 protrudes from the fringe of the side display panel 12. In this case, as shown in FIG. 7, when being assembled with the middle frame component 3, the fringe of the side panel 22 of the cover panel 2 is not prone to touch the fringe of the side display panel 12.

The bottom panel 21 may be in a panel shape of a polygon. In some aspects, the bottom panel 21 may be in a panel shape of a symmetric polygon, for example, a panel shape of a rectangle or a hexagon. Generally, a shape of the bottom panel 21 is the same as a shape of the main display panel 11. For example, if the main display panel 11 is a rectangle, usually, the shape of the bottom panel 21 is also a rectangle.

The straight edge 211 of the bottom panel 21 is an edge extending along a straight line. The straight edge 211 is an edge that extends along a straight line from a perspective of a naked eye, but may bend to a specific extent or have a specific radian from a microscopic perspective.

For a cover panel with a rectangular bottom panel 21, the bottom panel 21 has four straight edges 211, and two opposite straight edges 211 fall into one group. Side panels 22 connected to one group of straight edges 211 may be symmetrically disposed, and side panels 22 connected to the other group of straight edges 211 may be symmetrically disposed, or may be asymmetrically disposed.

In this embodiment, the middle frame component 3 includes a plurality of slender side edges 31, and the plurality of slender side edges 31 are connected together to form a frame. The side panel 22 of the cover panel 2 and the side edges 31 are assembled together.

Form 2

Figure 8:
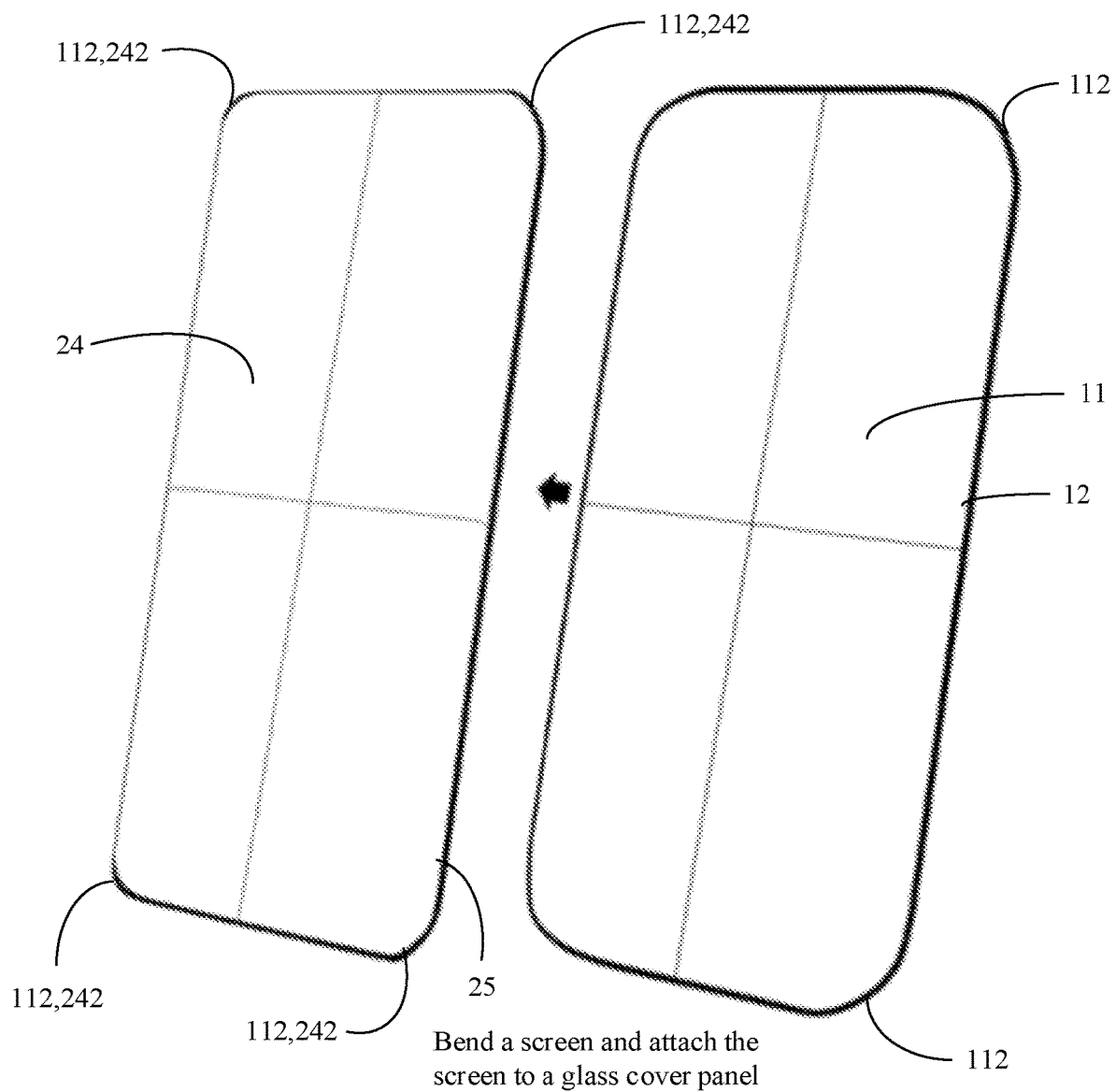
FIG. 8 is a schematic diagram of another implementation of attaching a curved screen to the inside of a cover panel according to an embodiment of this application.

As shown in FIG. 8 and FIG. 9, a view on the right in FIG. 8 is a three-dimensional view of an unbent screen (in this case, the screen is in a flat panel-shaped structure as a whole), and a view on the left is a three-dimensional view of a screen that is bent and attached to the inside of the cover panel 2. A shape and dimensions of the curved screen 1 are basically the same as those of the cover panel 2. FIG. 9 is an overall structural diagram of the electronic device, and the electronic device in the figure is a mobile phone. FIG. 9 shows a front view, a top view, a bottom view, a left view, and a right view of the electronic device. In FIG. 9, the curved screen, the cover panel 2, the middle frame component 3, and the rear housing 4 can be seen, and because the cover panel 2 is transparent, the curved screen 1 can be seen from the outside.

Referring to FIG. 9, the middle frame component 3 includes a wrap corner 32 and a wrap edge 33. The middle frame component 3 is in a frame-shaped structure, the wrap corner 32 is located at a corner position of the frame-shaped structure, and the wrap edge 33 is connected between adjacent wrap corners 32. The wrap corner 32 is in a three-dimensional arc-shaped structure. An inner surface of the wrap corner 32 is an arc surface, and an outer surface of the wrap corner 32 is also an arc surface. However, radians of the inner surface and the outer surface may be equal or unequal. Radians of all parts of the inner surface of the wrap corner 32 may be equal. Alternatively, radians of all parts of the inner surface of the wrap corner 32 may be unequal. For example, a radian of a center position is small, and a radian of a fringe position is large, or a radian of a center position is large, and a radian of a fringe position is small. Radians of all parts of the outer surface of the wrap corner 32 may be equal. Alternatively, radians of all parts of the outer surface of the wrap corner 32 may be unequal. For example, a radian of a center position is small, and a radian of a fringe position is large, or a radian of a center position is large, and a radian of a fringe position is small.

A cross section of a position of the wrap corner 32 in a direction parallel to the main surface of the electronic device is a first wrap corner cross section. Cross sections of the position of the wrap corner that are separately perpendicular to longitudinal directions of two wrap edges 33 connected to the wrap corner 32 are a second wrap corner cross section and a third wrap corner cross section.

The outer surface of the wrap corner 32 is presented as one arc on each first wrap corner cross section, and the inner surface of the wrap corner 32 is presented as one arc on each first wrap corner cross section. The outer surface of the wrap corner 32 is presented as one arc on each second wrap corner cross section, and the inner surface of the wrap corner 32 is presented as one arc on each second wrap corner cross section. The outer surface of the wrap corner 32 is presented as one arc on each third wrap corner cross section, and the inner surface of the wrap corner 32 is presented as one arc on each third wrap corner cross section.

As shown in FIG. 8 and FIG. 9, the cover panel 2 includes a bottom wall 24 and a plurality of side walls 25. The bottom wall 24 is located on the main surface of the electronic device, and the side wall 25 is located on the side surface of the electronic device. An included angle between the bottom wall 24 and the side wall 25 ranges from 80 degrees to 150 degrees, for example, 90 degrees. There are a plurality of straight edges 241 at the fringe of the bottom wall 24, and each straight edge 241 is correspondingly connected to one side wall 25. A position at which the side wall 25 is connected to the straight edge 241 of the bottom wall 24 may be disposed in the form of a connection using an arc-shaped chamfer. In the embodiments depicted in FIG. 8 and FIG. 9, the position at which the side wall 25 is connected to the straight edge 241 of the bottom wall 24 is in the form of a connection using an arc-shaped chamfer. Therefore, the straight edge 241 is not shown in the main view in FIG. 9, and the straight edge 241 can be seen in the top view, the bottom view, the left view, and the right view. Certainly, the straight edge 111 of the curved screen cannot be seen in the main view, either, and the straight edge 111 can be seen in the top view, the bottom view, the left view, and the right view.

A part at which two adjacent straight edges 241 of the bottom wall 24 intersect is a cover panel corner 242. There is a cover panel inner edge 251 and a cover panel outer edge 252 at the fringe of the side wall 25, the cover panel inner edge 251 is connected to the straight edge 241 of the bottom wall 24, and the cover panel outer edge 252 is located at the fringe of the cover panel 2. Both the cover panel inner edge 251 and the cover panel outer edge 252 of the side wall 25 are connected to the cover panel corner 242, and a segment connecting the cover panel outer edge 252 and the cover panel corner 242 is an arc-shaped transition edge.

For any cover panel corner 242 of the bottom wall 24, bending radians of an arc-shaped transition edge on both sides of the cover panel corner 242 may be equal or unequal. Radians of all parts of the art-shaped transition edge may be equal, or radians of all parts of the arc-shaped transition edge may be unequal.

Because the side wall 25 has a specific thickness, the arc-shaped transition edge is presented as one arc on each first cross section, and the first cross section is a cross section perpendicular to a thickness direction of the side wall 25. Radians of all parts of an arc that is of the arc-shaped transition edge and that is located on one first cross section may be equal or unequal. Radians of arcs of the arc-shaped transition edge that are located on different first cross sections may be equal or unequal.

The bottom wall 24 may be in a panel shape of a polygon. In some aspects, the bottom wall 24 may be in a panel shape of a symmetric polygon, for example, a panel shape of a rectangle or a hexagon. Generally, a shape of the bottom wall 24 is the same as a shape of the main display panel 11. For example, if the main display panel 11 is a rectangle, usually, the shape of the bottom wall 24 is also a rectangle.

The straight edge 241 of the bottom wall 24 is an edge extending along a straight line. The straight edge 241 is an edge that extends along a straight line from a perspective of a naked eye, but may bend to a specific extent or have a specific radian from a microscopic perspective.

For a cover panel 2 with a rectangular bottom wall 24, the bottom wall 24 has four straight edges 241, and two opposite straight edges 241 fall into one group. Side walls 25 connected to one group of straight edges 241 may be symmetrically disposed, and side walls 25 connected to the other group of straight edges 241 may be symmetrically disposed, or may be asymmetrically disposed.

As shown in FIG. 9, the curved screen 1 is attached to the inside or the outside of the cover panel 2. For example, the main display panel 11 is attached to the inside or the outside of the bottom wall 24 of the cover panel 2, the side display panel 12 is attached to the inside or the outside of the side wall 25 of the cover panel 2, the corner 112 of the main display panel 11 is located at a position of the cover panel corner 242, and the corner 112 is located on the main surface of the electronic device. A shape and dimensions of the bottom wall 24 of the cover panel 2 match those of the main display panel 11, such that the main display panel 11 exactly covers the entire bottom wall 24, and no part of the bottom wall 24 protrudes. For example, a shape and dimensions of the bottom wall 24 of the cover panel 2 are basically the same as those of the main display panel 11.

The cover panel 2 and the middle frame component 3 are assembled together. The wrap corner 32 of the middle frame component 3 is fastened to the cover panel corner 242 of the cover panel, and the wrap edge 33 of the middle frame component 3 is fastened to the side wall 25 of the cover panel 2. A width of the side wall 25 of the cover panel 2 may be equal to a width of the side display panel 12. In this case, the middle frame component 3 may fasten the side wall 25 of the cover panel 2 and the side display panel 12 of the curved screen.

Alternatively, a width of the side wall 25 of the cover panel 2 may be greater than a width of the side display panel 12. In this case, a fringe part of the side wall 25 of the cover panel 2 protrudes from the fringe of the side display panel 12, and when being assembled with the middle frame component 3, the fringe of the side wall 25 of the cover panel 2 is not prone to touch the fringe of the side display panel 12.

Based on the foregoing various implementations of the curved screen 1, for a curved screen 1 with a main display panel 11 of a symmetric polygon (for example, a rectangle), when the side display panel 12 has been bent to the side surface of the electronic device, a cross section of the curved screen 1 at a center position in a width direction is a first screen cross section, and a cross section of the curved screen 1 at a center position in a length direction is a second screen cross section. The curved screen 1 may have the following overall forms.

Form 1: Parts of the side display panel 12 that are located on both sides of the first screen cross section are symmetrical with respect to the first screen cross section, and parts of the side display panel 12 that are located on both sides of the second screen cross section are symmetrical with respect to the second screen cross section.

Form 2: Parts of the side display panel 12 that are located on both sides of the first screen cross section are asymmetrical with respect to the first screen cross section, and parts of the side display panel 12 that are located on both sides of the second screen cross section are symmetrical with respect to the second screen cross section.

Form 3: Parts of the side display panel 12 that are located on both sides of the first screen cross section are symmetrical with respect to the first screen cross section, and parts of the side display panel 12 that are located on both sides of the second screen cross section are asymmetrical with respect to the second screen cross section.

Form 4: Parts of the side display panel 12 that are located on both sides of the first screen cross section are asymmetrical with respect to the first screen cross section, and parts of the side display panel 12 that are located on both sides of the second screen cross section are asymmetrical with respect to the second screen cross section.

Form 5: Parts of the main display panel 11 that are located on both sides of the first screen cross section are symmetrical with respect to the first screen cross section, and parts of the main display panel 11 that are located on both sides of the second screen cross section are symmetrical with respect to the second screen cross section.

Form 6: Parts of the main display panel 11 that are located on both sides of the first screen cross section are asymmetrical with respect to the first screen cross section, and parts of the main display panel 11 that are located on both sides of the second screen cross section are symmetrical with respect to the second screen cross section.

Form 7: Parts of the main display panel 11 that are located on both sides of the first screen cross section are symmetrical with respect to the first screen cross section, and parts of the main display panel 11 that are located on both sides of the second screen cross section are asymmetrical with respect to the second screen cross section.

Form 8: Parts of the main display panel 11 that are located on both sides of the first screen cross section are asymmetrical with respect to the first screen cross section, and parts of the main display panel 11 that are located on both sides of the second screen cross section are asymmetrical with respect to the second screen cross section.

Based on the foregoing various implementations of the cover panel 2, for a cover panel with a bottom wall or a bottom panel of a symmetrical polygon (for example, a rectangle), a cross section of the cover panel 2 at a center position in a width direction is a first cover panel cross section, and a cross section of the cover panel 2 at a center position in a length direction is a second cover panel cross section. The cover panel 2 may have the following overall forms.

Form 1: Parts of the side panel 22 or the side wall 25 that are located on both sides of the first cover panel cross section are symmetrical with respect to the first cover panel cross section, and parts of the side panel 22 or the side wall 25 that are located on both sides of the second cover panel cross section are symmetrical with respect to the second cover panel cross section.

Form 2: Parts of the side panel 22 or the side wall 25 that are located on both sides of the first cover panel cross section are asymmetrical with respect to the first cover panel cross section, and parts of the side panel 22 or the side wall 25 that are located on both sides of the second cover panel cross section are symmetrical with respect to the second cover panel cross section.

Form 3: Parts of the side panel 22 or the side wall 25 that are located on both sides of the first cover panel cross section are symmetrical with respect to the first cover panel cross section, and parts of the side panel 22 or the side wall 25 that are located on both sides of the second cover panel cross section are asymmetrical with respect to the second cover panel cross section.

Form 4: Parts of the side panel 22 or the side wall 25 that are located on both sides of the first cover panel cross section are asymmetrical with respect to the first cover panel cross section, and parts of the side panel 22 or the side wall 25 that are located on both sides of the second cover panel cross section are asymmetrical with respect to the second cover panel cross section.

Form 5: Parts of the bottom panel 21 or the bottom wall 24 that are located on both sides of the first cover panel cross section are symmetrical with respect to the first cover panel cross section, and parts of the bottom panel 21 or the bottom wall 24 that are located on both sides of the second cover panel cross section are symmetrical with respect to the second cover panel cross section.

Form 6: Parts of the bottom panel 21 or the bottom wall 24 that are located on both sides of the first cover panel cross section are asymmetrical with respect to the first cover panel cross section, and parts of the bottom panel 21 or the bottom wall 24 that are located on both sides of the second cover panel cross section are symmetrical with respect to the second cover panel cross section.

Form 7: Parts of the bottom panel 21 or the bottom wall 24 that are located on both sides of the first cover panel cross section are symmetrical with respect to the first cover panel cross section, and parts of the bottom panel 21 or the bottom wall 24 that are located on both sides of the second cover panel cross section are asymmetrical with respect to the second cover panel cross section.

Form 8: Parts of the bottom panel 21 or the bottom wall 24 that are located on both sides of the first cover panel cross section are asymmetrical with respect to the first cover panel cross section, and parts of the bottom panel 21 or the bottom wall 24 that are located on both sides of the second cover panel cross section are asymmetrical with respect to the second cover panel cross section.

Form 9: Round corners located on both sides of the first cover panel cross section are symmetrical with respect to the first cover panel cross section, and round corners located on both sides of the second cover panel cross section are symmetrical with respect to the second cover panel cross section.

Form 10: Round corners located on both sides of the first cover panel cross section are asymmetrical with respect to the first cover panel cross section, and round corners located on both sides of the second cover panel cross section are symmetrical with respect to the second cover panel cross section.

Form 11: Round corners located on both sides of the first cover panel cross section are symmetrical with respect to the first cover panel cross section, and round corners located on both sides of the second cover panel cross section are asymmetrical with respect to the second cover panel cross section.

Form 12: Round corners located on both sides of the first cover panel cross section are asymmetrical with respect to the first cover panel cross section, and round corners located on both sides of the second cover panel cross section are asymmetrical with respect to the second cover panel cross section.

Based on the foregoing various implementations of the middle frame component 3, for an electronic device with a main surface of a symmetrical polygon (for example, a rectangle), a cross section at a center position in a width direction of the electronic device is a first reference cross section, and a cross section at a center position in a length direction of the electronic device is a second reference cross section. The middle frame component 3 may have the following overall forms.

Form 1: Parts of the wrap edge or the side edge of the middle frame component 3 that are located on both sides of the first reference cross section are symmetrical with respect to the first reference cross section, and parts of the wrap edge or the side edge of the middle frame component 3 that are located on both sides of the second reference cross section are symmetrical with respect to the second reference cross section.

Form 2: Parts of the wrap edge or the side edge of the middle frame component 3 that are located on both sides of the first reference cross section are symmetrical with respect to the first reference cross section, and parts of the wrap edge or the side edge of the middle frame component 3 that are located on both sides of the second reference cross section are asymmetrical with respect to the second reference cross section.

Form 3: Parts of the wrap edge or the side edge of the middle frame component 3 that are located on both sides of the first reference cross section are asymmetrical with respect to the first reference cross section, and parts of the wrap edge or the side edge of the middle frame component 3 that are located on both sides of the second reference cross section are symmetrical with respect to the second reference cross section.

Form 4: Parts of the wrap edge or the side edge of the middle frame component 3 that are located on both sides of the first reference cross section are asymmetrical with respect to the first reference cross section, and parts of the wrap edge or the side edge of the middle frame component 3 that are located on both sides of the second reference cross section are asymmetrical with respect to the second reference cross section.

Form 5: Wrap corners of the middle frame component 3 that are located on both sides of the first reference cross section are symmetrical with respect to the first reference cross section, and wrap corners of the middle frame component 3 that are located on both sides of the second reference cross section are symmetrical with respect to the second reference cross section.

Form 6: Wrap corners of the middle frame component 3 that are located on both sides of the first reference cross section are symmetrical with respect to the first reference cross section, and wrap corners of the middle frame component 3 that are located on both sides of the second reference cross section are asymmetrical with respect to the second reference cross section.

Form 7: Wrap corners of the middle frame component 3 that are located on both sides of the first reference cross section are asymmetrical with respect to the first reference cross section, and wrap corners of the middle frame component 3 that are located on both sides of the second reference cross section are symmetrical with respect to the second reference cross section.

Form 8: Wrap corners of the middle frame component 3 that are located on both sides of the first reference cross section are asymmetrical with respect to the first reference cross section, and wrap corners of the middle frame component 3 that are located on both sides of the second reference cross section are asymmetrical with respect to the second reference cross section.

The terms "first" and "second" are merely intended for a purpose of description, and shall not be understood as an indication or implication of relative importance or implicit indication of the quantity of indicated technical features. Therefore, a feature limited by "first" or "second" may explicitly or implicitly include one or more features. In the description of this application, unless otherwise stated, "a plurality of" means two or more than two.

In the descriptions of this specification, the described features, structures, materials, or characteristics may be combined in a proper manner in any one or more of the embodiments or examples.

What is claimed is:

1. An apparatus, comprising:
   a main surface comprising a fringe, wherein the main surface is configured to present content to a user;
   a side surface connected to the fringe;
   a cover panel;
   a curved screen attached to the cover panel and comprising:
      a main display panel located on the main surface and having a polygonal shape, wherein the main display panel comprises:
         a first straight edge;
         a second straight edge that intersects the first straight edge; and
         a corner formed by the intersection of the first straight edge and the second straight edge; and
      side display panels comprising a first side display panel located on the side surface, wherein the first side display panel comprises:
         an inner edge; and
         an outer edge comprising an arc-shaped transition edge that intersects the inner edge at the corner,
      wherein the curved screen is in a form of a closed round polygon or quasi-round polygon as a whole in a direction perpendicular to the main surface;
   a frame-shaped structure having a middle frame component, wherein the cover panel and a first housing of the apparatus are separately fixed on both sides of the middle frame component;
   a circuit board in which a working circuit is disposed, wherein the working circuit is configured to send a display instruction to the curved screen;
   a power supplier configured to supply power to the curved screen and the circuit board; and
   a second housing enclosed by the middle frame component, the cover panel, and the first housing, and wherein the circuit board and the power supplier are disposed in the second housing.

2. The apparatus of claim 1, wherein the cover panel comprises a bottom panel, round corners, and side panels, wherein a plurality of third straight edges is located at a fringe of the bottom panel, wherein the side panels include a first side panel connected to a fourth straight edge in the plurality of third straight edges, wherein a position at which adjacent third straight edges of the bottom panel intersect is connected to a first round corner in the round corners, wherein the first round corner is in a three-dimensional arc-shaped structure, wherein both sides of the first round corner are connected to the first side panel, wherein the first side display panel is attached to the first side panel of the cover panel, wherein the main display panel is attached to the bottom panel of the cover panel, wherein the corner is attached to a second position at which two adjacent third straight edges of the bottom panel intersect, wherein the middle frame component comprises a plurality of slender side edges connected together to form a frame, and wherein the first side panel of the cover panel and one of the slender side edges of the middle frame component are assembled together.

3. The apparatus of claim 2, wherein an inner surface of the first round corner is a first arc surface, and wherein an outer surface of the first round corner is a second arc surface.

4. The apparatus of claim 1, wherein the middle frame component comprises wrap corners and wrap edges, wherein the wrap corners include a first wrap corner located at a corner position of the frame-shaped structure, wherein the wrap edges include a first wrap edge connected between adjacent wrap corners, wherein the first wrap corner is in a three-dimensional arc-shaped structure, wherein the cover panel comprises a bottom wall and a first plurality of side walls, wherein a second plurality of third straight edges are located at a fringe of the bottom wall, wherein each third straight edge of the bottom wall is correspondingly connected to one side wall in the first plurality of side walls, wherein a part at which two adjacent third straight edges of the bottom wall intersect is a cover panel corner, wherein a cover panel inner edge and a cover panel outer edge are located at a fringe of the one side wall, wherein the cover panel inner edge is connected to a fourth straight edge in the second plurality of third straight edges, wherein the cover panel outer edge is located at a fringe of the cover panel, wherein the cover panel inner edge and the cover panel outer edge of the one side wall are both connected to the cover panel corner, wherein a segment connecting the cover panel outer edge and the cover panel corner is an arc-shaped transition edge, wherein the main display panel is attached to the bottom wall of the cover panel, wherein the first side display panel is attached to the one side wall of the cover panel, wherein the corner of the main display panel is located at a position of the cover panel corner, wherein the first wrap corner of the middle frame component is fastened to the cover panel corner of the cover panel, and wherein the first wrap edge of the middle frame component is fastened to the one side wall of the cover panel.

5. The apparatus of claim 4, wherein an inner surface of the first wrap corner is a first arc surface, and wherein an outer surface of the first wrap corner is a second arc surface.

6. The apparatus of claim 1, wherein the main display panel is configured to display content according to the display instruction when the curved screen is in a working state.

7. The apparatus of claim 1, wherein there is no gap in the corner of the main display panel.

8. An apparatus, comprising:
a cover panel; and
a curved screen attached to an inside portion of the cover panel, wherein the curved screen comprises:
a main display panel comprising:
a first straight edge;
a second straight edge that intersects the first straight edge; and
a corner formed by the intersection of the first straight edge and the second straight edge; and
a plurality of side display panels comprising a first side display panel, wherein the first side display panel comprises:
an inner edge; and
an outer edge comprising an arc-shaped transition edge that intersects the inner edge at the corner,
wherein the cover panel is in a box-shaped structure,
wherein the main display panel is attached to a bottom surface of the box-shaped structure,
wherein the first side display panel in the plurality of side display panels is attached to a side surface of the box-shaped structure, and
wherein the curved screen is in a form of a closed round or quasi-round polygon as a whole in a direction perpendicular to the bottom surface.

9. The apparatus of claim 8, wherein the cover panel comprises a bottom panel, round corners, and side panels, wherein a plurality of third straight edges is located at a fringe of the bottom panel, wherein the side panels include a first side panel connected to a fourth straight edge in the plurality of third straight edges, wherein a position at which adjacent third straight edges of the bottom panel intersect is connected to a first round corner in the round corners, wherein the first round corner is in a three-dimensional arc-shaped structure, wherein both sides of the first round corner are connected to the first side panel, wherein the first side display panel is attached to the first side panel of the cover panel, wherein the main display panel is attached to the bottom panel of the cover panel, and wherein the corner is attached to a second position at which two adjacent third straight edges of the bottom panel intersect.

10. The apparatus of claim 9, wherein an inner surface of the first round corner is a first arc surface, and wherein an outer surface of the first round corner is a second arc surface.

11. The apparatus of claim 8, wherein the main display panel is configured to display content when the curved screen is in a working state.

12. The apparatus of claim 8, wherein there is no gap in the corner of the main display panel.

13. The apparatus of claim 8, wherein the main display panel and the side display panels comprise a flexible organic light-emitting display (OLED).

14. The apparatus of claim 8, wherein an included angle between the main display panel and each of the side display panels is between 80 degrees and 150 degrees.

* * * * *